United States Patent [19]
Ridgely

[11] 3,937,649
[45] Feb. 10, 1976

[54] PROCESS AND SYSTEM FOR REMOVING TRITIUM

[76] Inventor: John N. Ridgely, 628 Rutledge Ave., Folsom, Pa. 19033

[22] Filed: Oct. 31, 1973

[21] Appl. No.: 411,249

[52] U.S. Cl................... 176/19 R; 176/37; 176/54; 55/68; 252/301.1 W
[51] Int. Cl.[2]........................................ G21C 17/00
[58] Field of Search................ 176/37, 19 R, 54, 55; 55/68; 252/301.1 W

[56] References Cited
UNITED STATES PATENTS

| | | | |
|---|---|---|---|
| 3,208,200 | 9/1965 | Gant et al. | 55/68 |
| 3,400,048 | 9/1968 | Boardman et al. | 176/55 X |
| 3,679,366 | 7/1972 | Benson et al. | 55/68 X |
| R27,598 | 3/1973 | Wright | 176/37 |

FOREIGN PATENTS OR APPLICATIONS

| | | | |
|---|---|---|---|
| 1,194,995 | 6/1965 | Germany | 176/37 |

OTHER PUBLICATIONS
Monitoring Reactor Effluents For Tritium: Problems & Possibilities, Osborne, Chalk River Nucl. Labs, Chalk River, Ontario, Canada, Sept., 1971.

Primary Examiner—Verlin R. Pendegrass
Assistant Examiner—P. A. Nelson
Attorney, Agent, or Firm—Paul & Paul

[57] ABSTRACT

A process and system for removing tritium, particularly from high temperature gas cooled atomic reactors (HTGR), is disclosed. Portions of the reactor coolant, which is permeated with the pervasive tritium atom, are processed to remove the tritium. Under conditions of elevated temperature and pressure, the reactor coolant is combined with gaseous oxygen, resulting in the formation of tritiated water vapor from the tritium in the reactor coolant and the gaseous oxygen. The tritiated water vapor and the remaining gaseous oxygen are then successively removed by fractional liquefaction steps. The reactor coolant is then recirculated to the reactor.

14 Claims, 4 Drawing Figures

PROCESS AND SYSTEM FOR REMOVING TRITIUM

BACKGROUND OF THE INVENTION

Tritium is a hydrogen atom containing one proton, two neutrons, and one electron. Radioactive tritium has a half-life of 12.33 years and emits beta particles during its decay. While the human skin will readily stop beta particles without any damage, tritium will easily vaporize and the inhalation of tritium is dangerous as internal body tissues are easily damaged by beta particles.

In response to the increasing demands for electrical power within the United States, more atomic reactor generating plants are being built, particularly those having high temperature gas cooled reactors (HTGR). In HTGR's, there is a large production of tritium. Tritium is so pervasive, that it easily penetrates the steel tubing of the steam generator of the reactor and into the water system. Once into the water system there are several ways for tritium to escape into the atmosphere. To date, tritium has been removed from HTGR's only by unrestrained release into the atmosphere, or into the water disposal system, or otherwise into the surrounding environment. As more and larger HTGR's are built, the pollution of the environment through this indiscriminate discharge steadily increases and will soon create a significant problem unless remedied. In fact, the maximum permissible amount of release of radiation to the environment established by the Atomic Energy Commission will be exceeded by the rate of production of tritium in the large HTGR's already in the planning stage.

SUMMARY OF THE INVENTION

Accordingly, it is among the objects of this invention to: provide a safe process and system for the removal of radioactive tritium from high temperature gas cooled atomic reactors without polluting the environment and to provide a process and system for removal of tritium from any system containing an inert-to-oxygen circulating fluid which becomes tritiated.

These and other objects of the invention are achieved by a process and system in which part of the reactor coolant which becomes permeated with tritium is continually removed and processed to remove the tritium. The process involves combining the removed reactor coolant under conditions of elevated temperature and pressure with gaseous oxygen, so as to result in a tritiated water vapor formation reaction from the tritium in the reactor coolant and the gaseous oxygen. The tritiated water vapor and the remaining gaseous oxygen are then successively removed by fractional liquefaction steps. The liquefied tritiated water vapor is then removed from the processing system and safely disposed of; the liquefied gaseous oxygen is used as cooling means in the water vapor liquefaction step and then used as the gaseous oxygen combined to form the water vapor; and the now untritiated reactor coolant is returned to the reactor for re-circulation.

The processing system is designed against accidents through the inclusion of radiation monitors at points immediately after removal of the reactor coolant from circulation and immediately prior to its return to recirculation, and through pressure and temperature sensors connected through electronic controls to fast-acting pneumatic valves which immediately shut the processing system down in case of any malfunction. An additional provision is the heating of the reactor coolant prior to its return to be re-circulated by means of a heat exchange with ordinary circulating water, thus resulting in a supply of chilled water for use elsewhere in the reactor system and supporting environment.

DESCRIPTION OF THE PREFERRED EMBODIMENT

During the operation of an atomic reactor, radioactive tritium, $H^3$, is produced as a side effect. Being such a light element, radioactive tritium becomes pervasive throughout the entire reactor, including the circulating reactor coolant (generally gaseous helium). Having a significant concentration of tritium is known as being tritiated. By processing the circulating reactor coolant continually, and removing the tritium from it, and then re-circulating the untritiated processed helium reactor coolant to absorb more radioactive tritium, the produced radioactive tritium may be effectively removed from the entire atomic reactor system.

Since tritium is essentially a hydrogen atom, under the proper conditions of temperature and pressure it will combine with oxygen to form water vapor, a reaction which is exothermic and therefore self-sustaining. Utilizing this principle, the separation of tritiated water vapor from the helium reactor coolant involves combining it with gaseous oxygen under the appropriate temperature and pressure conditions, and then successively removing the water vapor and oxygen from the helium reactor coolant by fractional liquefaction steps; then returning the helium to the reactor to be re-circulated.

The mechanism by which hydrogen and oxygen combine to form water is well known and is delineated, for example, in *Combustion, Flames and Explosion of Gases*, Louis N. Von Elbe, Second Edition, Academic Press, London, 1961, pages 22 to 64. Being exothermic, the reaction must be controlled so as neither to be overdamped, in which case the reaction will stop, nor be underdamped, in which case an explosion possibly would result. The reaction chain is most easily controlled by controlling the rate of flow of helium reactor coolant by means of a combination of temperature and pressure sensors, and appropriate controls. The reaction can be increased or decreased automatically to maintain the proper temperature and prevent the internal pressure from exceeding a specified amount.

Figure 1:
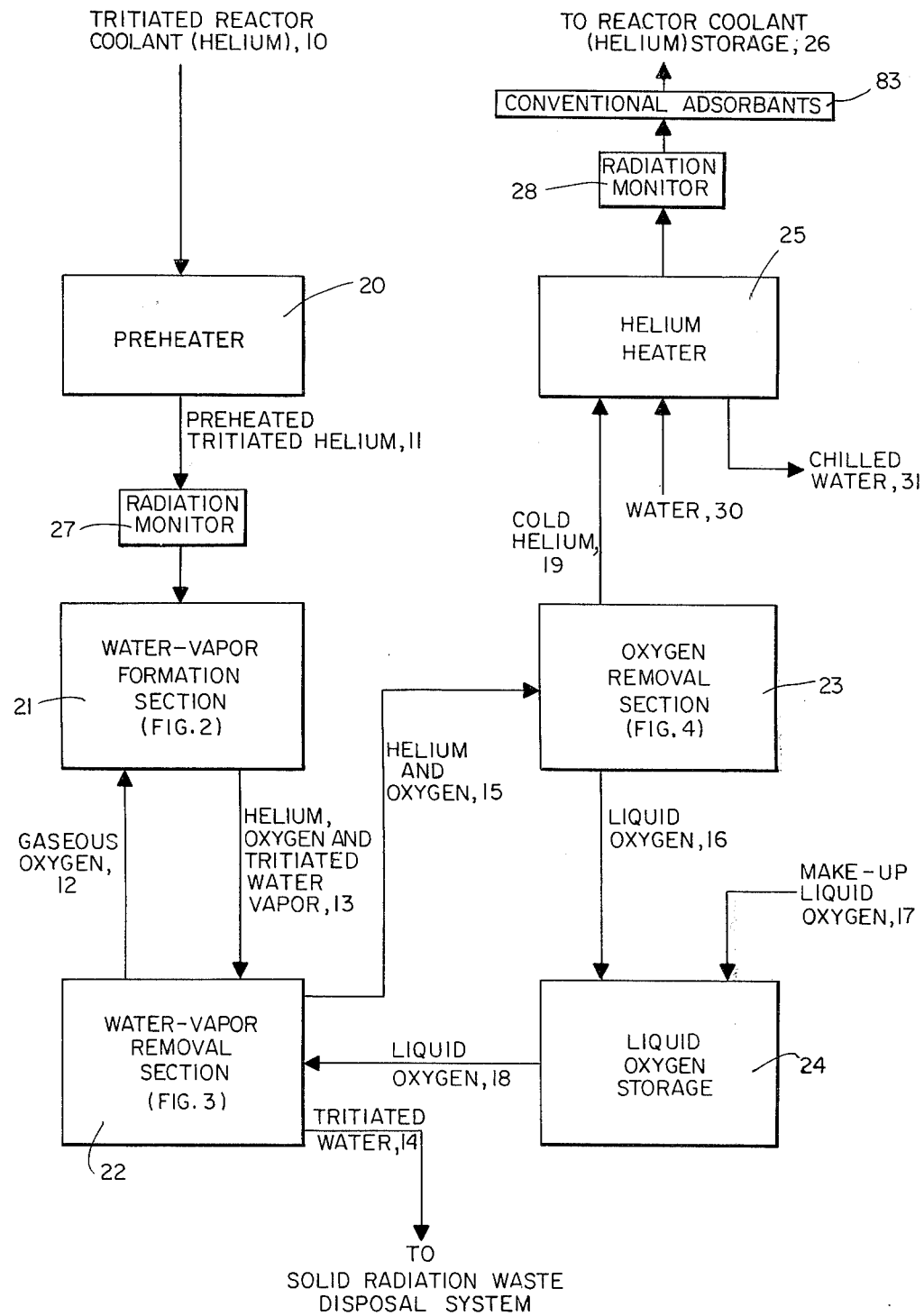
FIG. 1 is a schematic flow diagram of the process and system of the present invention with individual steps being shown in block form.

Referring to the figures, in FIG. 1 is shown a schematic flow diagram of the process and system for removing tritium of the present invention. A portion of the tritiated helium reactor coolant 10 is removed from circulating throughout the high temperature gas coolant atomic reactor and enters the normal purification train which removes the "hard" radiation. The coolant, now consisting only of helium and tritium, then enters the pre-heater 20 where it is heated from a temperature of approximately 200°F to the approximately 900°F temperature required for water vapor formation. The pre-heated tritiated helium 11 then enters water vapor formation section 21 where, under elevated temperature and pressure, it is combined with gaseous oxygen 12, resulting in tritiated water vapor being formed from the tritium in the helium and the gaseous oxygen. The helium, remaining gaseous oxygen, and tritiated water vapor mixture 13 then enters a water vapor removal section 22, where the mixture is cooled to a temperature sufficient to liquefy only the tritiated water vapor, which is then removed 14 to a safe radioactive waste disposal. The helium and oxygen mixture 15 then enters an oxygen removal section 23 in which the mixture is further cooled to liquefy only the oxygen, completing the second step of this two-step fractional liquefaction process. The liquefied oxygen 16 is then separated from the helium and removed to a liquid oxygen storage 24, where sufficient make-up liquid oxygen 17 is added to compensate for the oxygen consumed during the formation of water vapor, thus maintaining a constant level of oxygen. Liquid oxygen 18 from liquid oxygen storage is then used as cooling means in the water vapor removal section 22, during which the liquid oxygen 18 becomes gaseous oxygen, which is then used as the gaseous oxygen 12 supplied in the water vapor formation section 21. The cooled helium 19, at approximately a temperature of −300°F, after the separation of the liquid oxygen, then enters a helium heater 25 is which the helium is heated to at least room temperature, in preparation for its being re-circulated through the reactor. After being sufficiently heated, the helium may be further treated by conventional adsorbents 83 after which it enters a helium storage 26 where it remains until re-introduction to the circulating helium reactor coolant. The heating of the cooled helium can be accomplished by a heat exchange with ordinary circulating water 30, which leaves the helium heater section 25 as chilled water 31, which is then available for use elsewhere in the reactor system and supporting environment for the many various uses to which chilled water is put in an industrial plant. A radiation monitor 27 is placed upon the flow of tritiated helium reactor coolant from the reactor, and another radiation monitor 28 is placed upon the flow of untritiated helium as it leaves the helium heater 25 for helium storage 26 before re-introduction to the circulating reactor coolant. By means of the radiation monitors, malfunctionings of the tritium process and removal system can be detected rapidly.

Figure 2:
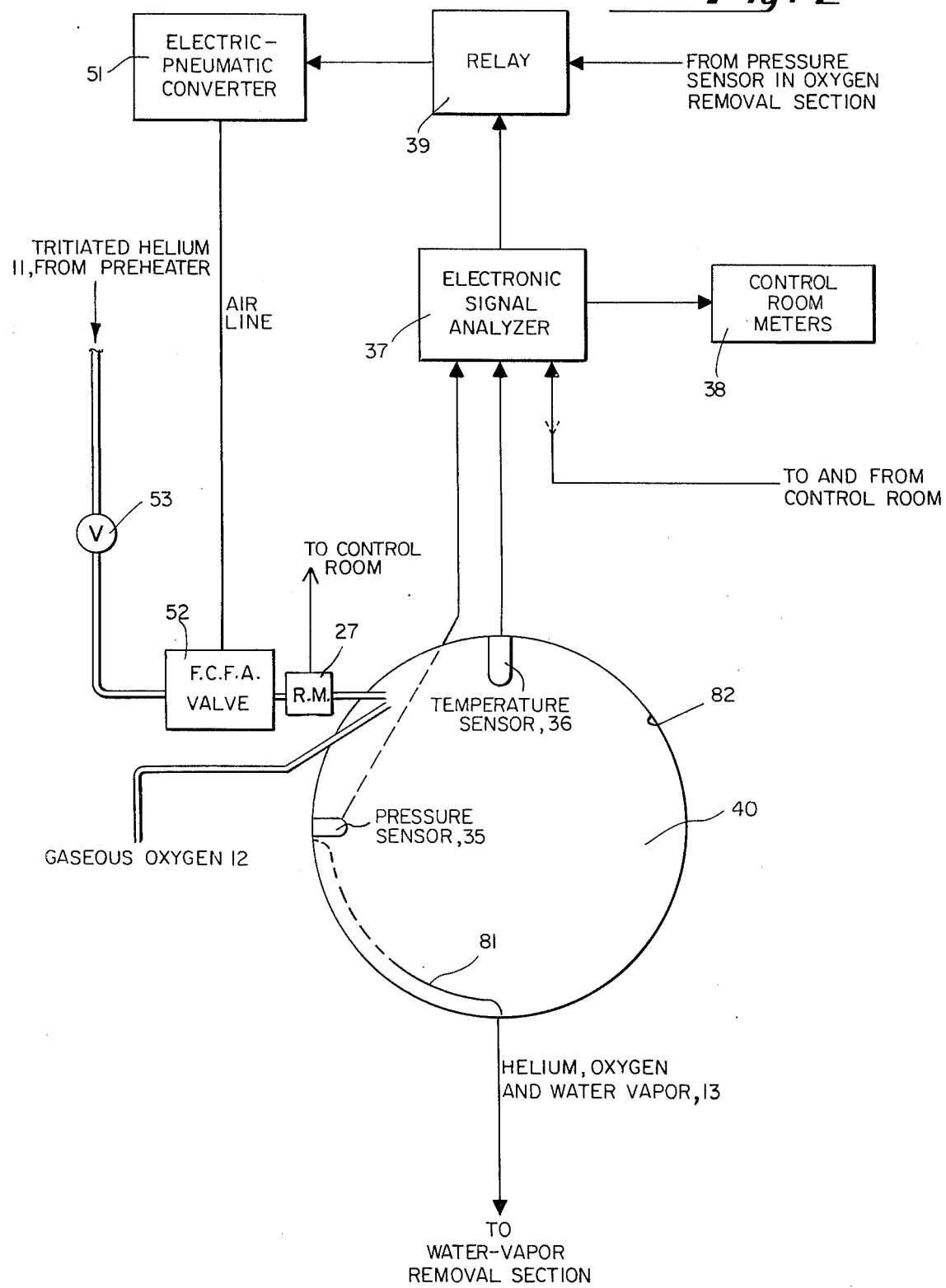
FIG. 2 is a schematic diagram of the water vapor formation section of the process and system of the present invention, and accompanying control mechanisms.

Referring to FIG. 2, the water vapor formation section is schematically diagramed. Tritiated helium reactor coolant 11 from pre-heater 20 is introduced into water vapor formation mixing section pressure vessel 40, which may be lined with an appropriate catalyst 82, or which may be unlined. Also introduced into mixing section 40 is gaseous oxygen 12 coming from water vapor removal section 22. Partially perforated mixing baffle 81 prevents reactor coolant and gaseous oxygen from flowing out of the bottom of vessel 40 before becoming sufficiently mixed. Within mixing section 40, the tritiated helium and the oxygen combine under conditions of elevated temperature and pressure. Gaseous oxygen 12, varying with the flow rate, has a temperature in the vicinity of from room temperature to 500°F. The temperature within mixing section vessel 40 is over 900°F. The mixing of helium, gaseous oxygen, and tritiated water vapor 13, leaves pressure vessel 40 to water vapor removal section 22. Pressure sensor 35 and temperature sensor 36 within mixing section vessel 40 generate signals to an electronic signal analyzer 37 and to a meter display 38 in a control room. A signal from the pressure sensor 61, in oxygen removal section 23, acting through a signal conditioner 71, operates relay 39 which permits the signal from analyzer 37 to operate, through an electric-pneumatic converter 51, a Fail-Closed Fast-Acting (F.C., F.A.) pneumatic valve 52 which can quite quickly shut-off the flow of tritiated helium reactor coolant 11 into mixing section vessel 40 when necessary. The flow of tritiated helium reactor coolant can also be shut-off by means of manual valve 53. A pneumatic shut-off valve is used since it, in practice, operates more quickly then high inertia solenoid-activated electrically operated valves. Mixture 13 of helium, oxygen and tritiated water vapor also contains small amounts of hydrogen peroxide generated from an intermediate step in the water vapor formation reaction chain.

Figure 3:
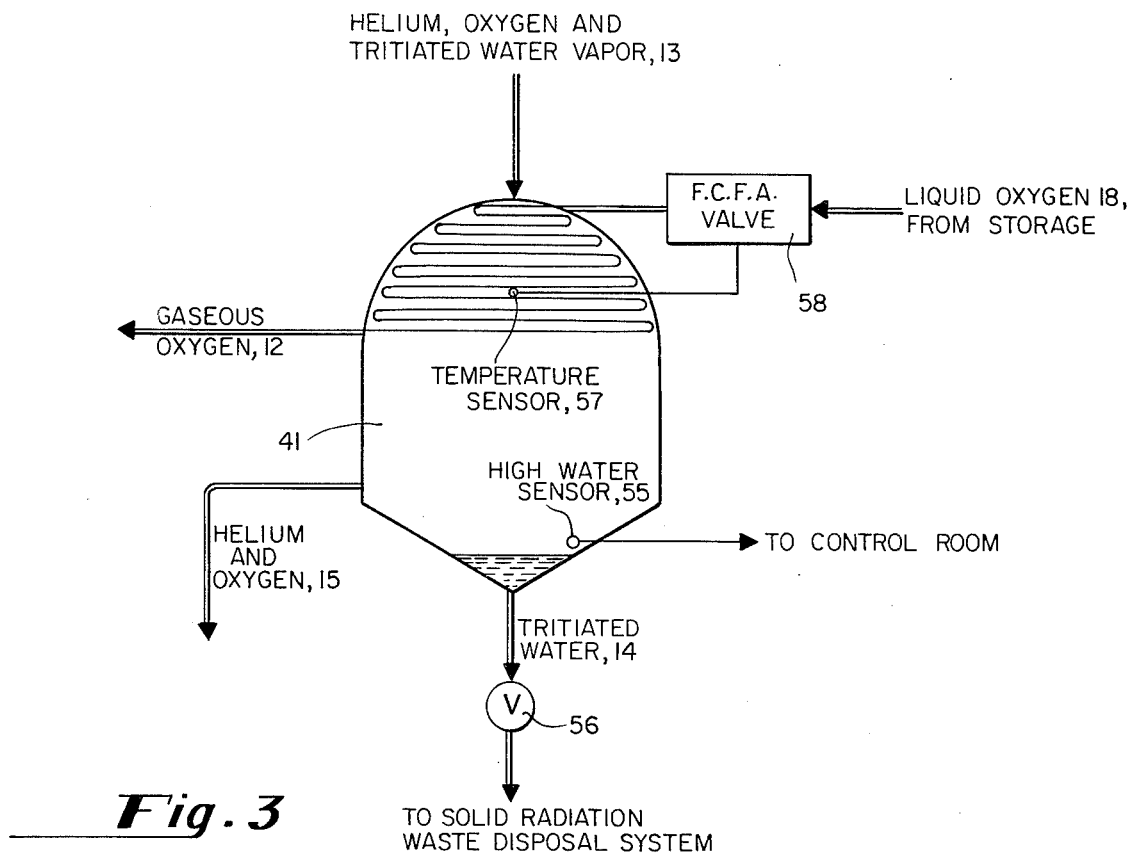
FIG. 3 is a schematic diagram of the water vapor removal section of the process and system of the present invention, and accompanying control mechanisms.

Referring to FIG. 3, the water vapor removal section 22 is schematically diagramed. Mixture 13 of helium, oxygen and tritiated water vapor enters heat exchange vessel 41. Within vessel 41 are coils through which liquid oxygen 18 passes in cooling the mixture 13. In the cooling process, the liquid oxygen of approximately −300°F temperature becomes gaseous oxygen at room temperature or above, depending upon the flow volume rate, and leaves as gaseous oxygen 12 to be used in the water vapor formation section 21. The mixture 13 is sufficiently cooled so that only tritiated water vapor is liquefied, which then collects in the bottom of vessel 41, and which is then removed as tritiated water 14 to be disposed of as radioactive waste material. Depending upon the amount of tritiated water, it may be diluted with other liquid radioactive waste material and disposed of in a usual manner or may be accumulated in a holding tank after which it will be solidified, for example, by mixing it with cement to form concrete which then will be shipped away for AEC approved burial. The mixture of untritiated helium and gaseous oxygen 15 is then removed to oxygen removal section 23. Vessel 41 may have either a float-operated high water sensor 55, as illustrated in FIG. 3, or a visual port for determining when the removal of tritiated water is appropriate for an opening of manual valve 56. A certain amount of tritiated water must remain in vessel 41 at all times to prevent the escape of gases through the tritiated water drain. A manually operated valve is preferred because of the small and gradual accumulation of tritiated water expected. The use of an automatic valve would make the system more complicated and more vulnerable to failures. The sensor 55 serves as a back-up to signal the need to remove some of the accumulated tritiated water. Temperature sensor 57 within the coil section of vessel 41 monitors the temperature within vessel 41 and through Fail-Closed, Fast-Acting pneumatic control valve 58, controls the flow of liquid oxygen through vessel 41 to prevent the condensated liquefied tritiated water from freezing. The flow rate of gaseous oxygen 12 out of vessel 41 is much higher than the flow rate of liquid oxygen 18 into the vessel.

Figure 4:
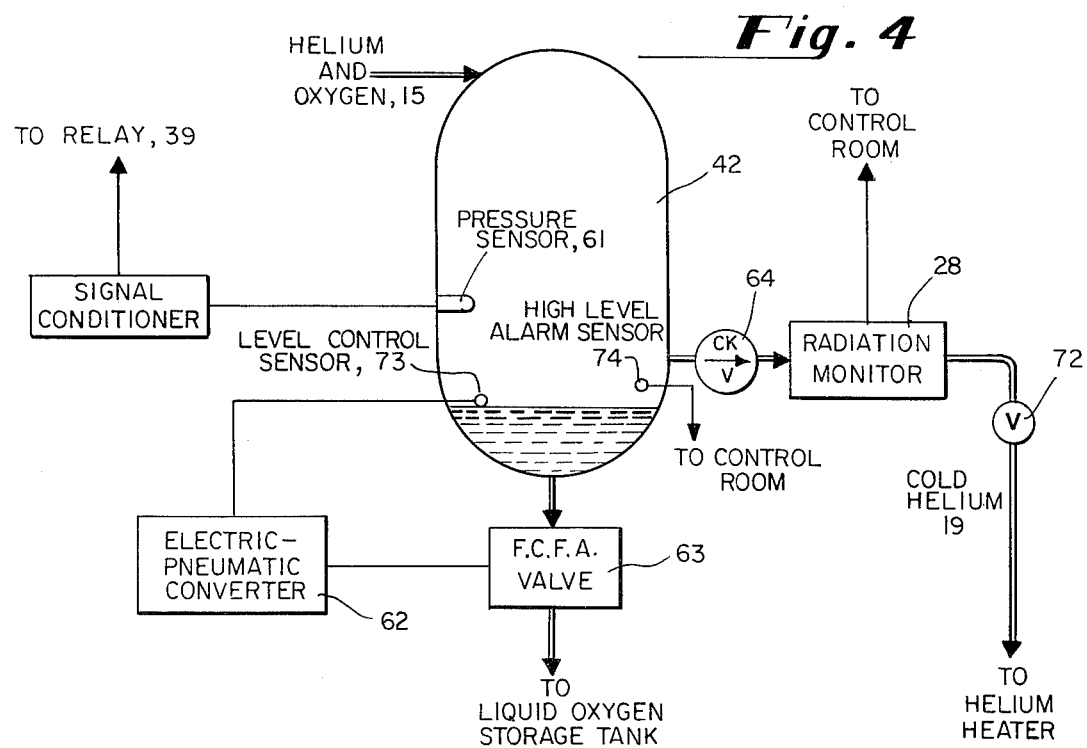
FIG. 4 is a schematic diagram of the oxygen removal section of the process and system of the present invention, and accompanying control mechanisms.

Referring to FIG. 4, oxygen removal section 23 is schematically diagramed. Mixture 15 of helium and gaseous oxygen enters oxygen removal vessel 42 within which mixture 15 is cooled to a temperature sufficient to liquefy only the oxygen. The liquid oxygen 16 then goes to the liquid oxygen storage section 24. The now untritiated cooled helium 19 is removed to helium heater 25. Pressure sensor 61 within vessel 42 is connected to signal conditioner 71 which operates relay 39. A level control sensor 73 is connected to electric-pneumatic converter 62 which operates Fail-Closed Fast-Acting pneumatic valve 63 to shut off the flow 16 of liquid oxygen should the pressure within vessel 42 become excessive. A high liquid oxygen level alarm 74 will alert the control room to a malfunctioning liquid oxygen removal system. The flow of helium 19 is assured of one-way progess by check valve 64 and manual valve 72 which provides complete system isolation. Radiation monitor 28 monitors the radiation level of the helium at this point.

SAFETY

The system of the present invention is designed to be quite safe. Considering as a design basis accident a situation when mixing vessel 40 ruptures, for some reason, helium reactor coolant would be released and the sudden pressure drop would cause excessive helium flow throughout the system. If unchecked, hot helium would pass over tritiated water, the water would instantly vaporize, and radiation would be expelled; and the increased helium flow could blow out the reaction chain. However, the temperature and pressure sensors 35 and 36 will close inlet valve 52 and signal the operator in the control room. As reactor coolant escapes, the low pressure sensor 61 in the oxygen removal section 23 will cause valve 52 to Fail-Closed. The lack of positive pressure in the oxygen removal vessel will also cause check valve 64 to close, thus preventing a loss of stored helium. Once valve 52 is closed, the temperature in water vapor removal section 22 will rapidly drop, which will cause temperature sensor 57 to close valve 58, thus shutting off the flow of liquid oxygen. It should be noted that the signal from 61, after conditioning, operates relay 39 which closes the contacts which electrically connect analyzer 37 with valve 51. If the circuit is broken (relay 39 becoming de-energized) valve 51 will automatically Fail-Close. This system will provide a higher response time than relying only on the output of 35 and 36.

Generally, the activity of tritium in unprocessed reactor coolant will increase to several thousand curies. The activity due to tritium penetrating the steam generator will become several hundred curies. The initial radiation monitor upon the flow of helium reactor coolant from the circulating coolant is used to provide reference data; subsequent monitors being utilized to detect tritium which is not removed due to a system failure or improper calibration. It is assumed that substantially all radioactive materials have been removed prior to entry of the tritiated reactor coolant into the system of the present invention except for tritium Additional radiation monitors may be installed at various points to monitor the maximum radiation to be received by personnel calibrating or servicing the equipment.

Control monitoring can be as simple as three lights and a switch or variable resistor, or as complicated as recorders, analyzers of chemical compositions and signal comparisons, digital displays, graphic or analytic projection analyses, or complete digital-analog computer analysis and control. The process and system of the present invention is readily adaptable to any type of controls desired.

The process and system of the present invention have been designed to insure maximum safety of the operator and the vicinity. All piping, phase changing containments and all pressure vessels are to be constructed to the same specifications and classifications as helium purification systems, helium storage systems and helium surge systems.

The material used for construction of all sections except the oxygen removal section, the drains, the liquid oxygen tubes, coils and valves should be incalloy 800. Incalloy 800 is basically 32% nickel, 21% chromium and 46% iron, and is generally manufactured and tested to ASME specification SB-407 and standard quality control tests. Other sections not constructed of incalloy 800 should be made of stainless steel in accordance with ASTM specification A423, (ASME specification SA-312) Grade TP 304L. The oxygen removal section should be a conventional liquefaction system modified as shown in FIG. 4 to include a pressure sensor, a gas removal line, a level control sensor, and high level alarm sensor. Sizes of tubings, sections, valves, and the like should be compatible.

Should the rate of the tritium production in the reactor be in excess of the rate of the oxidation reaction of this method under the conditions selected, so that a buildup of tritium occurs, the rate of the reaction may be accelerated by various expedients. For example, the temperature and/or pressure in the mixing section may be increased to any practical degree desired, and the mobility of the reactants imparted by the thermal agitation may be enhanced by supplemental mechanical agitation.

In order to provide sufficient dwell to consummate the oxidation reaction, the volume of the mixing section may be made as large as desired.

The controlled temperature of the cooling section may be suitably maintained as low as necessary to reduce the water vapor content to as low a value as desired.

The method of this application may be used in tandem with and to supplement prior are tritium removal methods using conventional adsorbents 83 such as potassium chloride, for example. The result of treatment of the reactor coolant by such combination of this method with the prior art method would be to minimize any tritium remaining in the helium dispatched to the helium storage, so that such remanent tritium would be less than would result from the use of either of the two methods alone.

Although a specific form of the present invention has been selected for illustration and the drawings and the above detailed description is drawn in specific terms for the purpose of describing this form of the invention, this detailed description of the preferred embodiment is not intended to limit the scope of the present invention. It will be understood that various changes in the details, materials, and arrangement of parts which have been described and illustrated above in order to explain the nature of the present invention, may be made by those skilled in the art and yet still be within the principle and scope of the present invention as defined in the appended claims.

What is claimed is:

1. A process for the removal of tritium from a system containing an inert-to-oxygen circulating fluid which becomes tritiated comprising the steps of: forming tritiated water vapor by combining with the tritiated circulating fluid gaseous oxygen under pressure and at a temperature sufficient to initiate and sustain a water vapor formation reaction between tritium in the circulating fluid and the gaseous oxygen; and then removing the tritiated water vapor from the circulating fluid-gaseous oxygen mixture, and the system, by fractional liquefaction.

2. A process for the removal of radioactive tritium from a high temperature gas-cooled atomic reactor system containing an inert-to-oxygen circulating coolant gas which becomes tritiated comprising the steps of:

removing temporarily from the tritiated circulating coolant gas a portion thereof;

mixing with the removed tritiated coolant gas gaseous oxygen at a pressure and at a temperature sufficient to initiate and sustain tritiated water vapor formation from tritium in the removed tritiated coolant gas and the gaseous oxygen;

cooling the mixture of coolant gas, gaseous oxygen, and tritiated water vapor to a temperature sufficient to liquefy only the tritiated water vapor;

separating the liquefied tritiated water vapor from the coolant gas and gaseous oxygen;

removing the liquefied tritiated water vapor from the high temperature gas-cooled atomic reactor system;

cooling the remaining coolant gas and gaseous oxygen mixture further to a temperature sufficient to liquefy only the gaseous oxygen;

separating the liquefied oxygen from the coolant gas; and then returning the coolant gas to the high temperature gas-cooled atomic reactor system to be re-circulated.

3. A process according to claim 2 further comprising the steps of:

pre-heating the removed tritiated coolant gas to a pre-determined mixing temperature prior to mixing with the gaseous oxygen;

heating the coolant gas to a pre-determined storage temperature after the separation of the liquefied oxygen therefrom, and before the return of the coolant gas to the high temperature gas-cooled reactor system; and then storing temporarily the coolant gas until it is returned to the circulating coolant gas in the high temperature gas-cooled atomic reactor system.

4. A process according to claim 3 where the heating means utilized in heating the coolant gas after the separation of liquefied oxygen therefrom comprises a heat exchange with water of much a much temperature than is the coolant gas after the separation of liquid oxygen therefrom, thus resulting in a chilled water supply which is available for use elsewhere in the high temperature gas-cooled atomic reactor system and supporting environment.

5. A process according to Claim 2 further comprising the steps of:

storing temporarily the liquefied oxygen separated from the coolant gas;

utilizing the stored liquefied oxygen as cooling means in the water vapor liquefaction step; and using the liquefied oxygen which was utilized as the cooling means in the water vapor liquefaction step, during which step said liquefied oxygen becomes gaseous oxygen, as the gaseous oxygen which is mixed with the removed tritiated coolant gas in the water vapor formation step.

6. A process according to claim 5 further comprising the step of adding to said stored liquefied oxygen a sufficient amount of liquid oxygen to replace the oxygen consumed by the formation of the water vapor.

7. A system for the removal of radioactive tritium from a high temperature gas-cooled atomic reactor containing an inert-to-oxygen circulating coolant gas which becomes tritiated, comprising:

a water vapor formation section, in which a temporarily removed portion of the tritiated coolant gas is combined with gaseous oxygen under elevated temperature and pressure sufficient to initiate and sustain a formation of tritiated water vapor from the tritium in the removed tritiated coolant gas and the gaseous oxygen;

a tritiated water vapor removal section, in which after its formation the tritiated water vapor is removed from the coolant gas-gaseous oxygen-tritiated water vapor mixture by cooling this mixture to a temperature sufficient to liquefy, and thereby separate and remove, only the tritiated water vapor; and an oxygen removal section in which the coolant gas-gaseous oxygen mixture remaining after the removal of the tritiated liquefied water vapor, is cooled further to a temperature sufficient to liquefy only the gaseous oxygen, which is then separated and removed from the coolant gas, the coolant gas then being returned to the high temperature gas-cooled atomic reactor to be re-circulated.

8. A system according to claim 7, further comprising:

a liquid oxygen storage section, in which the liquefied oxygen separated from the coolant gas is stored prior to its use again in the system, and in which additional liquid oxygen is added to replace the oxygen consumed by the formation of the water vapor.

9. A system according to claim 8 wherein the cooling means of the water vapor removal section comprises a heat exchange with liquid oxygen supplied from the liquid oxygen storage section, during which heat exchange the liquid oxygen becomes gaseous oxygen, which gaseous oxygen is then used as the gaseous oxygen mixed with the coolant gas in the water vapor formation section.

10. A system according to claim 7 further comprising:

a gaseous coolant pre-heating section, in which the tritiated coolant gas is pre-heated to a predetermined mixing temperature before being introduced into the water formation section; and a gaseous coolant heating section, in which the gaseous coolant, after separation of the liquefied oxygen therefrom, and before return to the high temperature gas-cooled atomic reactor, is heated to a pre-determined storage temperature, and then stored prior to its re-circulation.

11. A system according to claim 10 wherein the heating means utilized in heating the coolant gas after the separation of liquefied oxygen therefrom comprises a heat exchange with water of a much higher temperature than is the coolant gas after the separation of liquid oxygen therefrom, thus resulting in a chilled water supply which is available for use elsewhere in the high temperature gas-cooled atomic reactor system and supporting environment.

12. A system according to claim 7 wherein the portion of said water vapor formation section in which the tritiated coolant gas and the gaseous oxygen are physically combined is lined with a catalyst.

13. A system according to claim 7 in combination with a conventional adsorbent of tritium, said adsorbent being positioned after said oxygen removal section.

14. A process according to claim 2 wherein prior to returning the coolant gas to be re-circulated said coolant gas is passed over conventional adsorbents of tritium to even further insure its removal.

* * * * *

UNITED STATES PATENT OFFICE
CERTIFICATE OF CORRECTION

Patent No. 3,937,649  Dated February 10, 1976

Inventor(s) John N. Ridgely

It is certified that error appears in the above-identified patent and that said Letters Patent are hereby corrected as shown below:

Column 7, line 57 "water of much a much temperature" should read --water of a much higher temperature--.

Column 10, line 2 "absor-" should read --adsor- --.

Signed and Sealed this fourth Day of May 1976

[SEAL]

Attest:

RUTH C. MASON
Attesting Officer

C. MARSHALL DANN
Commissioner of Patents and Trademarks